Feb. 5, 1963

D. S. SCHWARTZ 3,076,903

PIEZOELECTRIC TRANSDUCER

Filed Dec. 20, 1957

2 Sheets-Sheet 1

INVENTOR.

Daniel S. Schwartz

By: Wallenstein & Spangenberg attys

INVENTOR.
Daniel S. Schwartz
BY
Wallenstein & Spangenberg
Attys.

3,076,903

PIEZOELECTRIC TRANSDUCER

Daniel S. Schwartz, Fords, N.J., assignor to Gulton Industries, Inc., Metuchen, N.J., a corporation of New Jersey Filed Dec. 20, 1957, Ser. No. 704,190
9 Claims. (Cl. 310—8.3)

The principal object of this invention is to provide an improved piezoelectric ceramic type transducer which produces, at low forces applied thereto, charge release outputs per unit of force which are appreciably higher than those produced in conventional transducers.

Briefly, the piezoelectric transducer of this invention includes a pair of parallel plates which are relatively movable toward and away from each other, and a piezoelectric ceramic element having electrodes fused on opposite faces thereof and interposed between the plates with the electrodes engaging the plates. The piezoelectric ceramic element has randomly oriented crystals and it is polarized in a direction between the electrodes for orienting some of the crystals thereof in that direction. If, in such a transducer, only compression forces are produced in the piezoelectric ceramic element by relatively moving the plates toward each other, as where the ceramic element and plates are flat and provide full surface contact therebetween, only a given charge release output will be produced for a given force depending upon the nature of the piezoelectric ceramic material and the degree of polarization thereof.

In accordance with this invention, however, the piezoelectric ceramic element and the plates on opposite sides thereof are shaped in a non-flat manner with respect to each other so that the electroded faces of the element engage the plates at laterally spaced areas within the face areas of the element. As a result, the piezoelectric ceramic element is interiorly subjected, when the plates are relatively moved toward each other, to bending, shear and torsion forces as well as compression forces, and this produces an appreciably larger charge release per unit of force than can be obtained by compression forces only. It is believed that these bending, shear, torsion and compression forces, so provided act upon the various randomly oriented crystals in the piezoelectric ceramic element to give a cumulative effect in producing the high charge release, which in a number of instances has run as high as 12 to 35 times the charge release obtained where only compression forces are applied.

In order to obtain this appreciably higher charge release, in accordance with one form of this invention, the plates used are flat plates and the piezoelectric ceramic element is made non-flat and the electroded faces thereof engage the flat plates at laterally spaced areas within the face areas of the element. In accordance with another form of this invention, the piezoelectric ceramic element is made flat and the plates are made non-flat so as to be engaged by the electroded faces of the flat element at laterally spaced areas within the face areas of the element. The piezoelectric ceramic element may have any desired peripheral configuration, such as circular, oval, polygonal or the like, and the faces of the element, or of the plates, may have any desired non-flat shape, as for example, spherical, cylindrical, parabolic hyperbolic, undulating, or substantially any irregular shape. The piezoelectric elements may also be provided with notches or the like for localizing stresses in the element when forces are applied thereto by the plates in order to increase further the charge release.

The transducer of this invention also may include means for preloading the piezoelectric ceramic element for obtaining still higher charge releases upon the application of desired forces thereto by the plates. The piezoelectric ceramic element may be formed from any desired piezoelectric ceramic materials, of which many are known in the art, such as, for example, the following materials and combinations thereof: barium titanate, strontium titanate, lead titanate, lead zirconate, cadmium niobate and the like.

Further objects of this invention reside in the details of construction of the piezoelectric transducer and in the cooperative relationships between the component parts thereof.

Other objects and advantages of this invention will become apparent to those skilled in the art upon reference to the accompanying specification, claims and drawings, in which:

Figure 1:
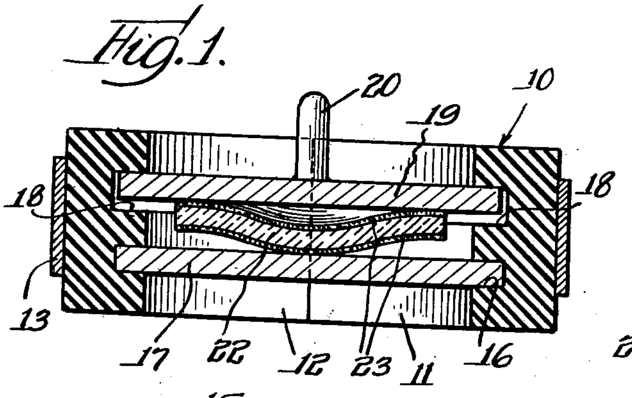
FIG. 1 is a vertical sectional view through one form of the piezoelectric transducer of this invention wherein non-flat piezoelectric ceramic elements are utilized.
Figure 3:
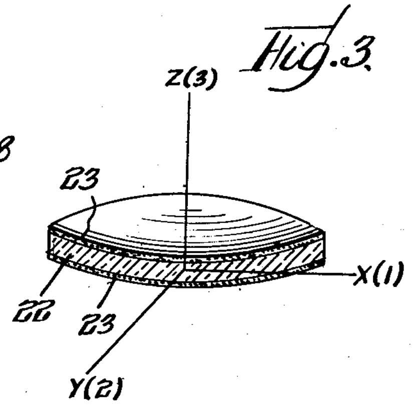
FIG. 3 is a perspective view in section of one form of a non-flat piezoelectric ceramic element which may be utilized in the transducer of FIG. 1, the element being substantially a circular portion of a sphere.
Figure 2:
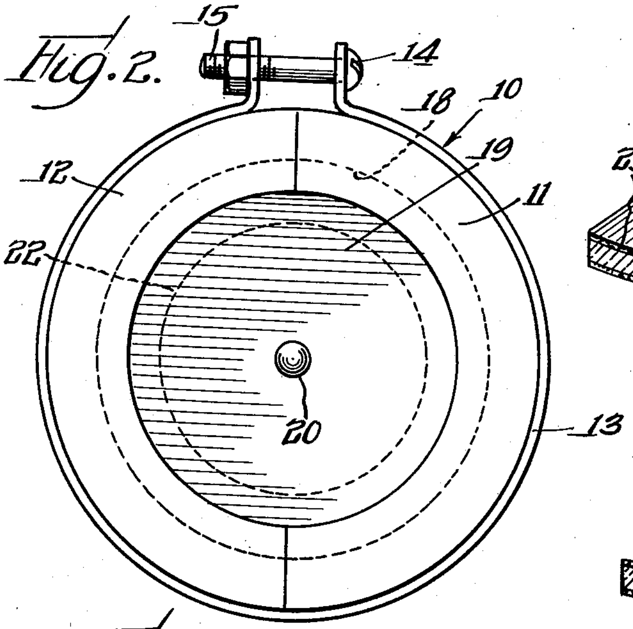
FIG. 2 is a top plan view of the piezoelectric transducer illustrated in FIG. 1.

Referring first to FIGS. 1, 2 and 3 one form of the piezoelectric transducer of this invention is generally designated at 10. It includes a mounting member which is preferably formed of two parts 11 and 12 which are removably secured together by a strap 13 which is drawn tight by a screw 14 and nut 15. The mounting member is preferably formed of electrical insulating material, such as Bakelite or the like, and is provided with a first internal groove 16 in which is rigidly secured a substantially flat metal plate 17. The mounting member is also provided with a second internal groove 18 which movably receives a substantially flat metal plate 19 which in turn is provided with an actuator extension 20.

Arranged between the plates 17 and 19 is a non-flat piezoelectric ceramic element 22 which is shown, for purposes of illustration, to be substantially a circular portion of a sphere. The element 22 is provided with surface electrodes 23 which are preferably silver electrodes fused in place thereon in the conventional manner. The electrodes 23 contact the plates 17 and 19 and electrical connections to the element 22 may be made through the plates 17 and 19 by attaching suitable leads thereto. The piezoelectric ceramic element 22 may be formed, in the usual manner, from any desired piezoelectric ceramic materials, of which many are known in the art, such as, for example, barium titanate, strontium titanate, lead titanate, lead zirconate, cadmium niobate and the like, and combinations thereof.

As shown in FIG. 3, the element 22 has three axes, X, Y and Z, which are conventionally termed the 1, 2 and 3 axes, respectively. The piezoelectric ceramic element is permanently polarized between the electrodes 23 along the Z or 3 axis by applying a D.C. voltage to the electrodes 23 of such a magnitude and for such a period of time so as to effect permanent polarization of the element in the manner well known in the art. When mechanical forces are applied to the piezoelectric ceramic element 22 along the 1, 2 or 3 axes, a voltage is produced between the electrodes 23 thereof. The instant invention is directed principally to the application of forces in the direction of the 3 axis of the element 22. This is accomplished by mechanically moving the plate 19 toward and away from the plate 17 by means of the actuator 20, the element 22 being stressed by such movement to produce a corresponding voltage across the electrodes 23.

If the piezoelectric element 22 were flat so as to provide full surface contact with the flat plates 17 and 19, only compression forces would be applied to the element 22 and the charge release at the electrodes 23 would be from the $d_{33}$ mode only, where $d$ is the piezoelectric coefficient for the particular ceramic, where the first subscript represents the direction of the applied or produced electric field, the 3 axis being taken by convention as the axis of polarization; and where the second subscript represents compression along the 3 axis. For example, where low force measurements of $1.138\times10^6$ dynes were applied to three different bodies of piezoelectric ceramics (body 1 comprising essentially 55% lead zirconate and 45% lead titanate, body 2 comprising essentially 96% barium titanate and 4% lead titanate, and body 3 comprising essentially 2% zirconium oxide, 0.2% ferric oxide and 97.8% barium titanate) in the $d_{33}$ mode only, the low force charge release outputs for such bodies were:

Body 1, $d_{33}{}^A=1.4\times10^{-15}$ coul./dyne
Body 2, $d_{33}{}^A=1.3\times10^{-15}$ coul./dyne
Body 3, $d_{33}{}^A=1.3\times10^{-15}$ coul./dyne However, in accordance with this invention the piezoelectric ceramic element 22 is non-flat so that the element engages the flat plates 17 and 19 at spaced areas within the face areas of the element. As a result the piezoelectric ceramic element 22 is interiorly subjected, when the plates 17 and 19 are moved toward each other, to other force modes, such as to bending, shear and torsion forces, as well as to the $d_{33}$ compression forces. This produces an appreciably larger charge release per unit of force than can be produced by the $d_{33}$ compression forces only. It is believed that these bending, shear, torsion and compression forces, so provided in the non-flat piezoelectric ceramic element 22, act upon the various randomly oriented crystals in the elements to provide a cumulative effect in producing the high charge release, which is many times larger than the charge release obtained where only the $d_{33}$ compression forces are applied.

Non-flat samples of the aforementioned bodies 1, 2 and 3 have been low force tested by applying a similar low force of $1.138\times10^6$ dynes thereto and the charge release output measured and determined. For example, five samples of body 1, in the form of non-flat discs 1⅞" diameter and 1/16" thick were permanently polarized in the normal manner and 6 days after polarizing were low force tested. The tests resulted in the following results, the charge release output being in terms of $Z_{gp}{}^A$ because of the presence of bending, torsion and shear forces within the samples, as well as compression forces:

| Sample No.: | $Z_{gp}{}^A$ ($10^{-15}$ coul./dyne) |
|---|---|
| 1 | 7.3 |
| 2 | 3.8 |
| 3 | 4.3 |
| 4 | 3.4 |
| 5 | 5.7 |

These charge release outputs are considerably greater than the $1.4\times10^{-15}$ coul./dyne charge release output obtained from flat samples where only compression forces are produced in such samples. The variations in charge release outputs of the non-flat samples are believed to be due to different degrees of non-flatness. That these increased charge release outputs are due to bending, torsion and shear modes of stressing, as well as compression modes, has been borne out by experiment. In this respect, the aforementioned samples of body 1 were preloaded with a large static load of substantially 7 pounds and then force tested with a low force of $1.138\times10^6$ dynes with the following results:

| Sample No.: | $Z_{gp}{}^A$ ($10^{-15}$ coul./dyne) |
|---|---|
| 1 | 2.14 |
| 2 | 0.58 |
| 3 | 1.4 |
| 4 | 1.08 |
| 5 | 2.7 |

When these charge release outputs with large preloading are compared with those without preloading, it is seen that they are considerably less. This large static preload has the effect of straightening out the samples so that the effects of the bending, torsion and shear modes of stressing are substantially reduced under these conditions of large static preloading.

About three weeks after polarizing, the aforementioned five samples of body 1 were repolarized in the original direction, with the exception that sample No. 1 was repolarized in the opposite direction, the repolarizing being performed in the usual manner. One day after the repolarization, the various samples were low force tested with forces of $1.138\times10^6$ dynes with the following results:

| Sample No.: | $Z_{gp}{}^A$ ($10^{-15}$ coul./dyne) |
|---|---|
| 1 | 13.3 |
| 2 | 6.6 |
| 3 | 8.0 |
| 4 | 12.7 |
| 5 | 18.0 |

These test results show that the sensitivity was considerably greater than the sensitivity of the samples tested six days after the original polarization, this despite the fact that sample No. 1 was reversely repolarized. It is believed that the steps of repolarization caused the samples to become still more non-flat thereby increasing the effects of the bending, torsion and shear modes of stressing of the samples. Also the samples were not optimumly polarized upon first polarization.

As a further example, six samples of body 2 were also low force tested. Here irregular areas of 12 mil thick sheets of body 2 were permanently polarized, but utilizing only about 1/10 the voltage normally used for polarizing. These samples, which were clearly non-flat with the exception that sample 6 appeared to be substantially flat, were low force tested at $1.138\times10^6$ dynes, the results being as follows:

| Sample No.: | $Z_{gp}{}^A$ ($10^{-15}$ coul./dyne) |
|---|---|
| 1 | 19 |
| 2 | 16.2 |
| 3 | 27.1 |
| 4 | 20.5 |
| 5 | 45.0 |
| 6 | 2.95 |

As was expected from previous results, sample 6 which appeared to be fairly flat had much less output than any other sample. These charge release outputs are considerably more than the charge release output for the same body 2 when flat, namely, $d_{33}{}^A=1.3\times10^{-15}$ coul./dyne. This further demonstrates that the increased sensitivity of these non-flat samples is due to the effects of the bending, torsion and shear modes of stressing when the non-flat elements are subjected to forces in the direction of the 3 axis.

As still another example, eight non-flat samples of body 3 were also low force tested. Here various rectangular shapes of 10 mil thick sheets of body 3 were permanently polarized and to make sure that high outputs were not due to polarization procedures, these samples were also underpolarized. Ten days after polarization, the samples were low force tested at $1.138 \times 10^6$ dynes, with the following results:

| Sample No.: | $Z_{gp}^A$ ($10^{-15}$ coul./dyne) |
|---|---|
| 1 | 9.4 |
| 2 | 7.9 |
| 3 | 52 |
| 4 | 15 |
| 5 | 29 |
| 6 | 15 |
| 7 | 18 |
| 8 | 21 |

These charge release outputs for the non-flat samples are considerably greater than the charge release output of $d_{33}^A = 1.3 \times 10^{-15}$ coul./dyne for a flat sample of body 3. This further shows that the increased sensitivity of these non-flat samples is due to the effects of the bending, torsion and shear modes of stressing when the non-flat samples are subjected to forces in the direction of the 3 axis. The non-flat rectangular sample No. 3 had a slot cut in one end thereof and it is believed that the slot operated to localize the stresses in the element so as to increase still further the effects of the bending, torsion and shear modes of stressing.

In another experiment, two non-flat or warped samples of 5 mil thick sheets of body 3 were permanently polarized and low force tested at $1.138 \times 10$ dynes with the following results:

| Sample No.: | $Z_{gp}^A$ ($10^{-15}$ coul./dyne) |
|---|---|
| 1 | 62 |
| 2 | 76 |

These charge release outputs are phenominally high.

Figure 4:
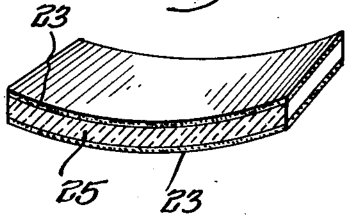
FIG. 4 is a perspective view in section of another form of a non-flat piezoelectric ceramic element which is substantially a rectangular portion of a cylinder.
Figure 5:
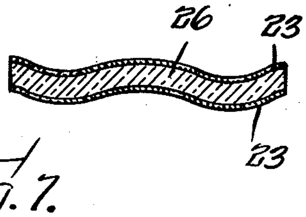
FIG. 5 is a sectional view of a further form of a non-flat piezoelectric ceramic element which is undulating in configuration.
Figures 6, 7:
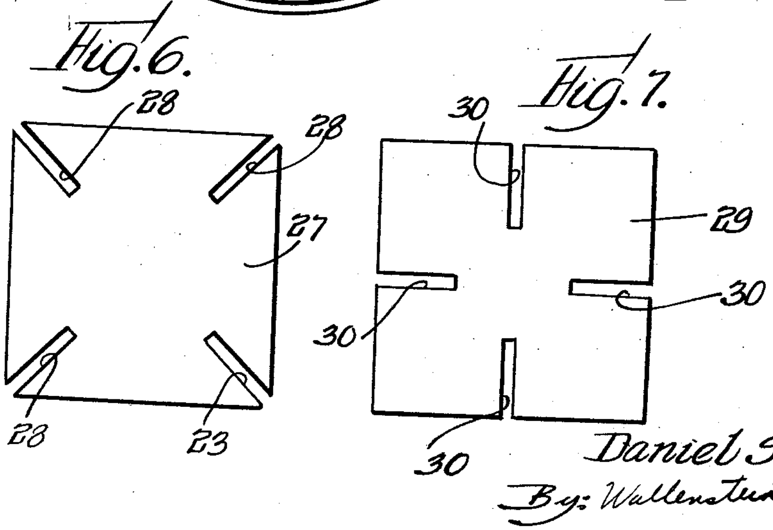
FIGS. 6 and 7 are plan views of still further forms of non-flat piezoelectric ceramic elements which are notched for localizing stresses.

The electroded non-flat piezoelectric ceramic element 22 arranged between the flat plates 17 and 19 for producing high charge release outputs (high sensitivity) for given forces applied thereto by the plates along the 3 axis may have substantially any non-flat shape, such as a warped shape, or substantially a circular portion of a sphere as illustrated in FIG. 3. It may also take the form of substantially a rectangular portion of a cylinder as indicated at 25 in FIG. 4, or an undulating piece as indicated at 26 in FIG. 5. The element may be rectangular or square as indicated at 27 and 29 in FIGS. 6 and 7 and may be provided with slots 28 at the corners as illustrated in FIG. 6 or slots 30 at the edges as illustrated in FIG. 7. The slots 28 and 30 operate to localize the stresses in the non-flat ceramic elements for still further increasing the sensitivity thereof. The important feature of this form of the invention is that the piezoelectric ceramic element is non-flat so that bending, torsion and shear modes of stressing, in addition to compression modes of stressing, are provided to produce increased sensitivity.

Figure 9:
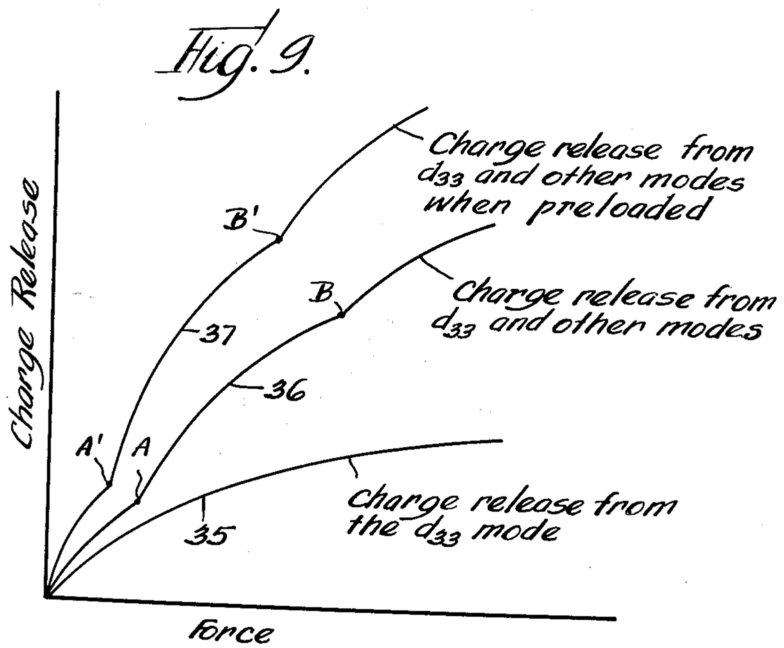
FIG. 9 is a graph depicting charge release against force for illustrating the attributes of this invention.

In FIG. 9, which is a graph plotting charge release against force, curve 35 represents the charge release from a flat piezoelectric ceramic element which is compressed by a pair of flat plates to provide only a $d_{33}$ mode of stressing. Curve 36 represents the charge release from a non-flat piezoelectric ceramic element which is compressed by a pair of flat plates, the increased charge release being brought about by bending, torsion and shear modes of stressing in addition to compression modes of stressing. In order to provide high charge release sooner along the force axis, the points along the curve 36, such as points A and B, may be moved to form curve 37, including point A' and B', by lightly preloading the piezoelectric ceramic element in the transducer. This causes the effects of the bending, torsion and shear modes of stressing to appear sooner. This can be accomplished by placing a light static load on the plate 19 to provide an initial or preload condition. This can also be accomplished by so spacing the plates 17 and 19 in the transducer as to place the piezoelectric ceramic element under an initial compression of the desired amount.

Figure 8:
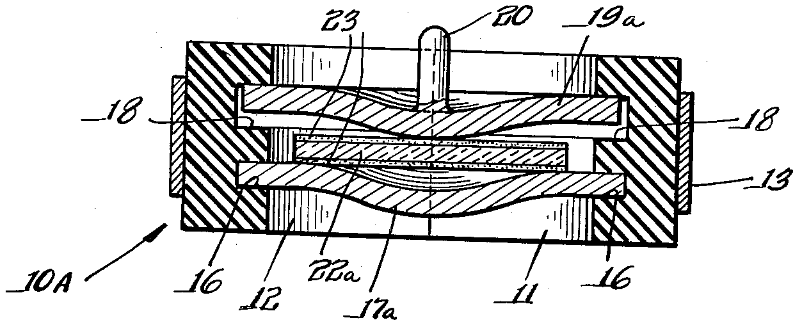
FIG. 8 is a vertical sectional view through another form of the piezoelectric transducer of this invention wherein non-flat plates are utilized.

Instead of making the piezoelectric ceramic element 22 non-flat and the plates 17 and 19 flat, as illustrated in FIG. 1, the plates 17A and 19A may be made non-flat and the piezoelectric ceramic element 22A flat, as illustrated in FIG. 8. Substantially the same results are obtained by so doing, the flat piezoelectric ceramic element 22A also being subjected to bending, torsion and shear modes of stressing, in addition to compression modes of stressing, because of the non-flat plates 17A and 19A.

While for purposes of illustration several forms of this invention have been disclosed, other forms thereof may become apparent to those skilled in the art upon reference to this disclosure, and, therefore, this invention is to be limited only by the scope of the appended claims.

I claim as my invention:

1. A piezoelectric transducer comprising a pair of parallel plates having spaced apart opposed faces, means for relatively moving the plates toward and away from each other, and a piezoelectric ceramic element including randomly oriented crystals and having electrodes fused on opposite faces thereof and interposed between the plates with the electrodes engaging the opposed faces of the plates, said piezoelectric ceramic element being polarized in a direction between the opposed faces of the plates for orienting some of the crystals thereof in that direction, the electroded faces of said piezoelectric ceramic element and the opposed faces of said plates being non-flat with respect to each other so that the electroded faces of the element engage the faces of the plates at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only.

2. A piezoelectric transducer comprising a pair of parallel plates having spaced apart opposed faces, means for relatively moving the plates toward and away from each other, and a piezoelectric ceramic element including randomly oriented crystals and having electrodes fused on opposite faces thereof and interposed between the plates with the electrodes engaging the opposed faces of the plates, said piezoelectric ceramic element being polarized in a direction between the opposed faces of the plates for orienting some of the crystals thereof in that direction, the electroded faces of said piezoelectric element being non-flat and engaging the opposed flat faces of the plates at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only.

3. A piezoelectric transducer comprising a pair of parallel plates having spaced apart opposed forces, means for relatively moving the plates toward and away from each other, and a piezoelectric ceramic element including randomly oriented crystals and having opposite flat faces with electrodes fused on said opposite faces and interposed between the plates with the electrodes engaging the opposed faces of the plates, said piezoelectric ceramic element being polarized in a direction between the opposed faces of the plates for orienting some of the crystals thereof in that direction, the opposed faces of said plates being non-flat and engaging the electroded faces of the element at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only.

4. A piezoelectric transducer comprising a pair of parallel plates having spaced apart opposed faces and being relatively movable toward and away from each other, and a piezoelectric ceramic element including randomly oriented crystals and having electrodes fused on opposite faces thereof and interposed between the plates with the electrodes engaging the opposed faces of the plates, said piezoelectric ceramic element being polarized in a direction between the opposed faces of the plates for orienting some of the crystals thereof in that direction, the electroded faces of said piezoelectric ceramic element and the opposed faces of said plates being non-flat with respect to each other so that the electroded faces of the element engage the faces of the plates at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only, means for initially relatively moving the plates toward each other for applying and maintaining an initial force on the piezoelectric ceramic element, and means subsequently relatively moving the plates toward each other for applying an additional force to the piezoelectric ceramic element.

5. A piezoelectric transducer comprising a pair of parallel plates having spaced apart opposed flat faces and being relatively movable toward and away from each other, and a piezoelectric ceramic element including randomly oriented crystals and having electrodes fused on opposite faces thereof and interposed between the plates with the electrodes engaging the opposed faces of the plates, said piezoelectric ceramic element being polarized in a direction between the opposed faces of the plates for orienting some of the crystals thereof in that direction, the electroded faces of said piezoelectric element being non-flat and engaging the opposed flat faces of the plates at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only, means for initially relatively moving the plates toward each other for applying and maintaining an initial force on the piezoelectric ceramic element, and means subsequently relatively moving the plates toward each other for applying an additional force to the piezoelectric ceramic element.

6. A piezoelectric transducer comprising a pair of parallel plates having spaced apart opposed faces and being relatively movable toward and away from each other, and a piezoelectric ceramic element including randomly oriented crystals and having opposite flat faces with electrodes fused on said opposite faces and interposed between the plates with the electrodes engaging the opposed faces of the plates, said piezoelectric ceramic element being polarized in a direction between the opposed faces of the plates for orienting some of the crystals thereof in that direction, the opposed faces of said plates being non-flat and engaging the electroded faces of the element at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only, means for initially relatively moving the plates toward each other for applying and maintaining an initial force on the piezoelectric ceramic element, and means subsequently relatively moving the plates toward each other for applying an additional force to the piezoelectric ceramic element.

7. A piezoelectric transducer comprising a pair of parallel plates having spaced apart opposed faces, means for relatively moving the plates toward and away from each other, and a piezoelectric ceramic element including randomly oriented crystals and having electrodes fused on opposite faces thereof and interposed between the plates with the electrodes engaging the opposed faces of the plates, said piezoelectric ceramic element being polarized in a direction between the opposed faces of the plates for orienting some of the crystals thereof in that direction, the electroded faces of said piezoelectric ceramic element and the opposed faces of said plates being non-flat with respect to each other so that the electroded faces of the element engage the faces of the plates at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only, said piezoelectric ceramic element being provided with notches therein for localizing stresses therein as the plates are relatively moved toward each other.

8. A piezoelectric transducer comprising a pair of parallel plates having spaced apart opposed flat faces, means for relatively moving the plates toward and away from each other, and a piezoelectric ceramic element including randomly oriented crystals and having electrodes fused on opposite faces thereof and interposed between the plates with the electrodes engaging the opposed faces of the plates, said piezoelectric ceramic element being polarized in a direction between the opposed faces of the plates for orienting some of the crystals thereof in that direction, the electroded faces of said piezoelectric element being non-flat and engaging the opposed flat faces of the plates at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only, said piezoelectric ceramic element being provided with notches therein for localizing stresses therein as the plates are relatively moved toward each other.

9. A piezoelectric transducer comprising a pair of parallel plates having spaced apart opposed faces, means for relatively moving the plates toward and away from each other, and a piezoelectric ceramic element including randomly oriented crystals and having opposite flat faces with electrodes fused on said opposite faces and interposed between the plates with the electrodes engaging the opposed faces of the plates, said piezoelectric ceramic element being polarized in a direction between the opposed faces of the plates for orienting some of the crystals thereof in that direction, the opposed faces of said plates being non-flat and engaging the electroded faces of the element at laterally spaced areas within the face areas of the element, whereby the piezoelectric ceramic element is interiorly subjected, when the plates are relatively moved toward each other, to bending, shear and torsion forces as well as compression forces for producing an appreciably larger charge release per unit of force than can be obtained by compression forces only, said piezoelectric ceramic element being provided with notches therein for localizing stresses therein as the plates are relatively moved toward each other.

References Cited in the file of this patent

UNITED STATES PATENTS

| | | |
|---|---|---|
| 2,133,647 | Pierce | Oct. 18, 1938 |
| 2,639,393 | Birt et al. | May 19, 1953 |
| 2,803,129 | Bradfield | Aug. 20, 1957 |